May 11, 1954 W. H. T. HOLDEN 2,678,409

SIGNALING SYSTEM

Filed Aug. 31, 1950 2 Sheets-Sheet 1

INVENTOR
W. H. T. HOLDEN
BY J W Schmied
ATTORNEY

May 11, 1954 W. H. T. HOLDEN 2,678,409

SIGNALING SYSTEM

Filed Aug. 31, 1950 2 Sheets-Sheet 2

INVENTOR
W. H. T. HOLDEN
BY J W Schmied
ATTORNEY

Patented May 11, 1954 2,678,409

UNITED STATES PATENT OFFICE 2,678,409

SIGNALING SYSTEM

William H. T. Holden, Woodside, N. Y., assignor to Bell Telephone Laboratories, Incorporated, New York, N. Y., a corporation of New York Application August 31, 1950, Serial No. 182,468

12 Claims. (Cl. 315—166)

This invention relates generally to signaling systems and more particularly to arrangements in such systems for detecting, counting, and registering signal impulses.

The main object of the present invention is the improvement of such detecting, counting and registering arrangements, particularly with reference to the rapidity of response to signal impulses and to the reliability of operation in response to such impulses.

In present-day signaling systems, such as may be useful with automatic telephone systems for instance, continuous improvement is being sought to increase the speed of response and to improve the reliability of circuits used for detecting, counting, and registering signals. In the telephone art in particular, continuous effort is expended towards devising and developing circuits which will respond more accurately and more reliably at a rapid rate to signals, such for instance as dial pulses or the like.

The present invention, while not necessarily restricted thereto as regards its utility or scope, finds ready application in automatic telephone systems where apparatus and circuits are necessary to accomplish these pulse detection, counting, and registering functions. An exemplary embodiment of the present invention is shown herein as capable of being incorporated in an automatic telephone system of the cross-bar type, such as that disclosed in Patent 2,585,904 to A. J. Busch of February 19, 1952. A skeletonized disclosure of the system shown in the Busch patent is set forth in Patent 2,616,974 to J. W. Dehn of November 4, 1952. The Dehn disclosure shows details of an originating register circuit of the cross-bar system, which circuit is comparable in context and function to the disclosure herein chosen as an exemplary embodiment of the present invention.

The function of an originating register, among others, in the cross-bar system disclosed by Busch and Dehn, is to receive, to detect, to count, and to register dial pulse digits transmitted thereto under the control of a calling subscriber during the initiation by the latter of a request for a telephone connection.

An object of the present invention is the improvement of such circuitry as the above-mentioned originating register circuits in regard to the reliability of the functioning thereof and the rapidity of response thereby to signal impulses.

A specific object of the present invention is the provision of improved means for enabling such circuits to register the pulse count of one or more series of impulses.

The present invention contemplates means for detecting impulses and a chain of electron discharge devices for counting these impulses under the control of the detecting means. The counting chain is arranged to be stepped from device to device along the chain in response to impulses of a series such that at the end of such a series the last device activated represents the pulse count of the series. Means is provided for recycling the chain at the end of each series of impulses in preparation for counting the pulse content of a succeeding series. A check circuit is shown in this disclosure for detecting the failure of any device in the counting chain to be activated when it is supposed to be activated in response to an impulse. This circuit comprises a group of electron discharge devices which cooperate with each other, with the impulse detecting means, and with the counting chain to measure a time delay. Signal means is energized through the agency of said group of devices if the devices in the counting chain do not respond properly to impulses within the said delay time. This check circuit is disclosed and claimed in Patent 2,623,108 to W. H. T. Holden of December 23, 1952 (which patent issued from an application which was a division of the present application), and the check circuit is in the nature of an improvement over a similar check circuit arrangement disclosed and claimed in Patent 2,609,498 to A. E. Bachelet and F. K. Low of September 2, 1952.

The check circuit comprises an electron discharge device which is energized responsive to each pulse, a second discharge device energized responsive to the energization of said first device but after a time delay, and a third discharge device energized if the counting chain properly advances in response to each pulse thereby to deenergize said first device and thereby to prevent the energization of said second device. These devices are arranged such that if said third device is not energized within a specified period of time, to indicate the proper advance of the counting chain, then said first device is not deenergized, whereupon said second device will be energized after a measured time delay to sound an alarm indicative of trouble.

The present invention more particularly contemplates improved circuit means for transferring the pulse count of a series of impulses counted by a chain of electron discharge devices or the like from the counting chain to registering means for storage pending the counting of other series for like storage or pending the usage of such registration by some other circuit. Registering means is provided for each series of impulses and such means are controlled jointly from the counting chain and from a steering circuit which determines into which register a particular series of counted impulses shall be registered. Each register is provided with a plurality of storage devices which may be energized or activated on a selective basis to indicate the pulse content of a series of impulses. The pulse counting chain is electrically connected through voltage responsive first gating means to all devices of all registers. The steering circuit is connected electrically to all such devices through second voltage responsive gating means. A storage device will become activated or energized only when both gates associated therewith are properly affected by suitable voltages derived jointly from the counting chain and from the steering circuit.

The invention, outlined above, will be explained with the aid of the following detailed disclosure of the exemplary embodiment thereof, the drawings forming a part of such disclosure being described generally as follows:

Fig. 1 shows the pulse receiving, detecting, and counting circuits of a cross-bar originating register circuit embodying the invention; and Fig. 2 shows the registers and steering circuits of the originating register embodying the invention.

*General description*

The present invention is herein disclosed as embodied in circuits which may be used in an automatic telephone system such as is disclosed in the above-mentioned Busch disclosure. Busch discloses in detail a cross-bar system wherein originating register circuits are used for transmitting dial tone to calling subscribers, detecting and counting pulses of called digits, registering these called digits, and seizing an idle marker circuit for the purpose of having such a marker complete the desired connection. Since the present disclosure of the invention relates particularly to the pulse detection, counting, checking, and registering functions of an originating register, details other than of such a circuit may be obtained from the Busch or Dehn disclosures.

As may be obtained from the Busch or Dehn disclosure, the general sequence of events during the originating of a call by a subscriber is as follows:

(1) The calling subscriber lifts his receiver thereby seizing an idle marker circuit and automatically informing the seized marker that a dial tone connection is desired;

(2) The seized marker tests for and seizes an idle originating register circuit;

(3) The marker interconnects the calling line with the seized originating register circuit over the cross-bar switch train and then the marker releases;

(4) The originating register transmits dial tone to the calling subscriber;

(5) The calling subscriber dials the digits of the called number or other desired destination;

(6) The originating register receives, detects, follows, and counts the pulses of each digit and registers such digit;

(7) When a sufficient number of digits have been registered therein, the originating register seizes an idle marker circuit and transfers thereto, among other items of information pertaining to the call, the digits so registered; and, (8) The marker, when it has received all of the information from the originating register, releases the originating register, completes the call, and then releases itself.

Since the present invention is described herein as embodied only in circuits of an originating register, the subsequent detailed description will not cover items (1), (7) and (8) above. Such matters, however, are fully disclosed by Busch and Dehn and are not necessary to the present description.

*Detailed description*

Figure 1:
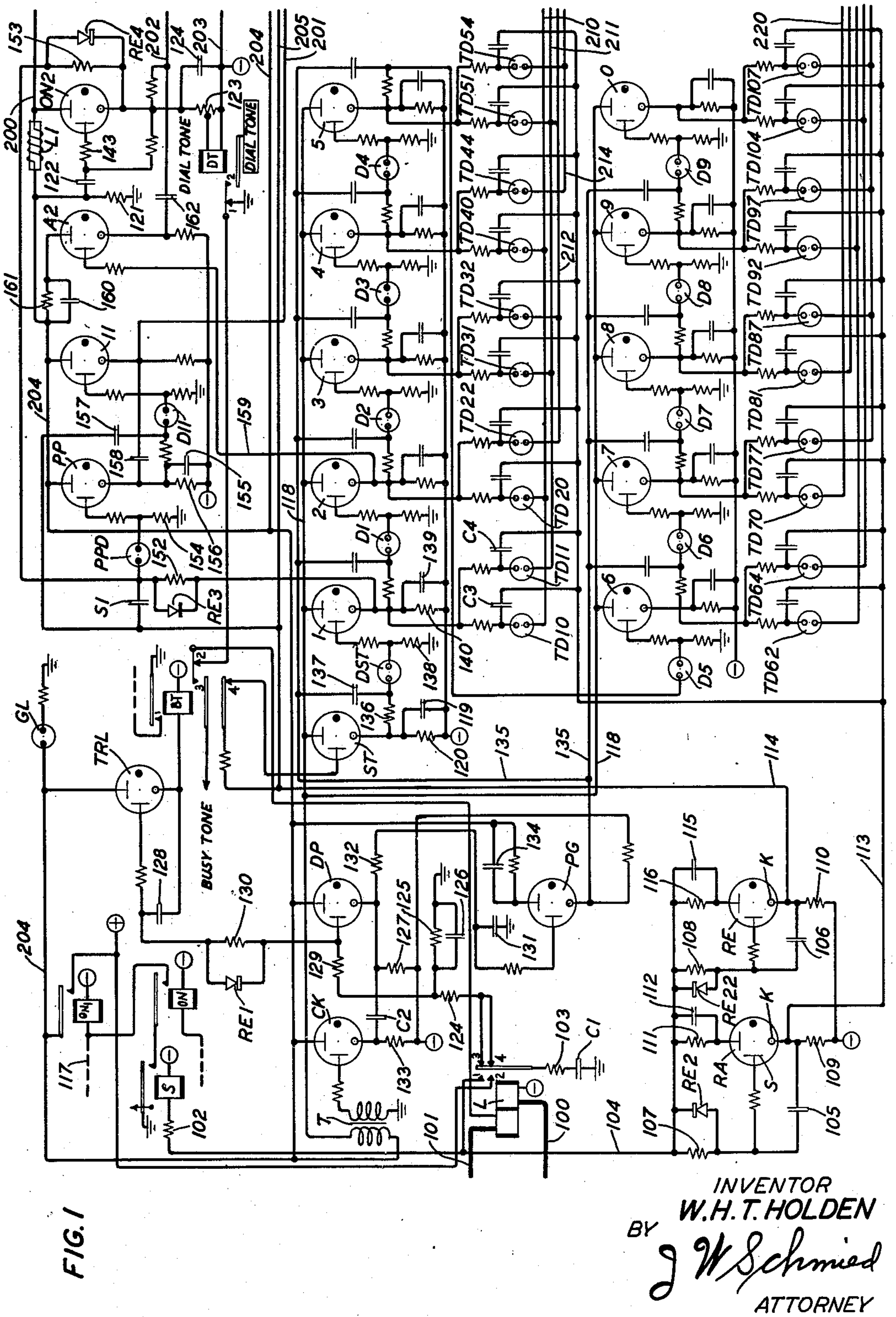

Hereinafter whenever a part of the drawing is referred to by its reference character, such as the off-normal relay ON(1), the designation "ON" refers to the reference character which identifies the part on the drawing, and the designation "(1)" refers to the figure of the drawing wherein that part is located. Thus the designation of relay "ON(1)" means the relay marked "ON" on Fig. 1, etc.

*Seizure of originating register*

Figure 2:
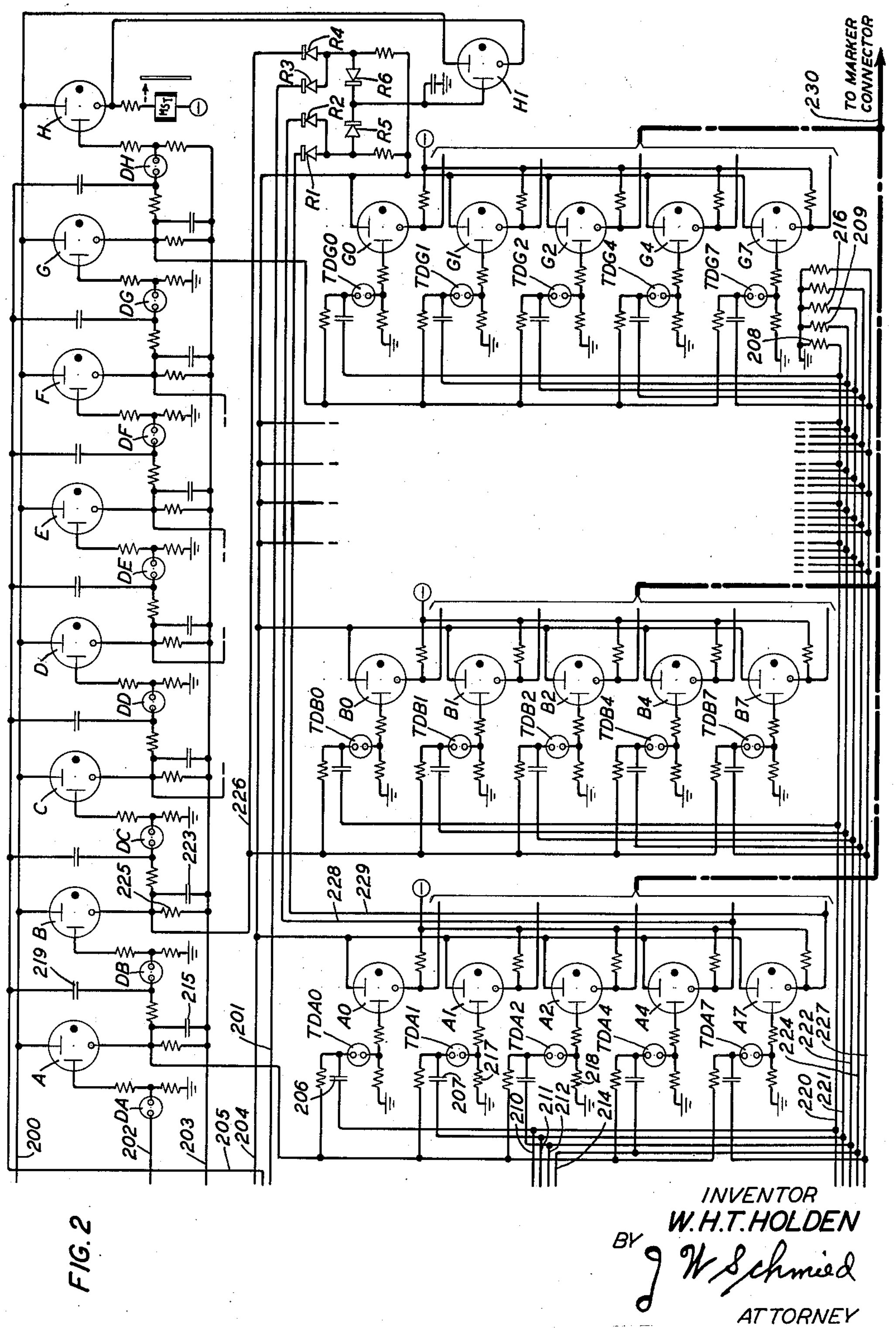

When the marker seizes an idle originating register circuit, such as is disclosed partly in Figs. 1 and 2, the off-normal relay ON(1) thereof is operated by the marker. This relay ON(1) will remain operated as long as the register circuit is being used or until the register is released prematurely for one of a number of possible reasons.

*Interconnection between calling subscriber and originating register*

After the seizure by a marker of an idle originating register circuit, the marker effects an interconnection over the cross-bar switch train between the seized register and the calling line, thereby closing the ring and tip conductors 100 and 101 of the register over the calling line loop. The line relay L(1) is operated in a circuit extending from ground, over contact 1 of the dial tone relay DT(1), contact 2 of the busy tone relay BT(1), left winding of relay L(1), tip conductor 101, over the switch train and the line loop, back over the ring conductor 100, right winding of relay L(1), to negative battery. (It is to be understood that whenever a voltage is indicated as negative or positive it is to be assumed that the opposite pole of the source is grounded unless otherwise designated or mentioned.)

Relay L(1), upon operating on the initial line loop closure performs three functions as disclosed:

(1) The slow-to-release relay S(1) operates in a circuit from negative battery, through the winding of relay S(1), through resistance 102, contacts 1 and 2 and armature of relay L(1), to positive battery. The relay S(1) is energized each time that relay L(1) is operated (closed line loop) and is permitted to start releasing each time relay L(1) is released (open line loop periods representing pulses of a digit). The slow-release characteristic of relay S(1) assists in making sure that relay S(1) does not release during the release time of relay L(1) representing pulses of a digit. There is another circuit phenomenon which further assists relay S(1) in remaining operated during the release time of relay L(1). Such phenomenon will be described presently.

(2) Condenser C1(1) acquires a charge in a circuit extending from positive battery (130 volts positive for instance), over contact 2 of relay L(1), armature of relay L(1), resistance 103, to ground through condenser C1(1). Condenser C1(1) acquires a positive charge upon its upper plate each time relay L(1) operates. This voltage will be approximately full battery potential (+130 volts). As will be described in detail hereinafter, this charge on condenser C1(1) is used as the pulsing source for controlling the counting chain and control tubes when relay L(1) releases in response to each open line loop pulse.

(3) Positive battery potential is applied over contacts 2 and 1 and armature of relay L(1), over conductor 104 to the circuits associated with the gas tubes RA(1) and RE(1). Tubes RA(1) and RE(1) are normally extinguished and therefore their cathodes K are at negative battery potential (say minus 50 volts with respect to ground). Positive battery potential applied to conductor 104 starts the charging of condensers 105 and 106 in parallel circuits extending from conductor 104, through resistances 107 and 108, condensers 105 and 106, resistances 109 and 110, to negative battery. The rectifiers, such as rectifier RE2(1) in shunt of resistance 107, have little if any effect upon the charging time of the condensers because the rectifiers are so poled as to represent relatively high impedances when the voltage at their arrows is negative with respect to the other terminal. (These rectifier units will be encountered throughout the discussion and it is to be understood that when the arrow terminal is more positive than the other terminal, these units represent low impedances and will pass large currents readily; however, as has been mentioned, when the voltage polarity is reversed, these units represent high impedances which however are finite—not open circuits.) The time constant of the charging circuit for condenser 106 is longer than that for condenser 105; therefore, assuming that they are permitted to charge up at will, condenser 105 will acquire a sufficiently positive voltage on its left terminal, with respect to negative battery, to fire tube RA(1) before tube RE(1) is fired by its condenser 106. This time difference is important with regard to subsequent discussion. The time constants are arranged such that tubes RA(1) and RE(1) will both fire if relay L(1) remains operated long enough to represent the pause between digits (interdigital time) and will thus probably fire upon the long pause between the first operation of relay L(1) and the first pulse of the first digit.

When tube RA(1) fires, by virtue of condenser 105 having acquired sufficient voltage upon its left plate to break down the starter gap S—K, tube RA(1) will pass a surge of current which will by-pass the anode resistance 111 through condenser 112 which acts as a short-circuit under the transient condition. This current surge passing through the cathode resistance 109 raises the potential at the cathode K of tube RA(1) about 100 volts more positive; that is, to about plus 50 volts with respect to ground. This pulse is applied to conductor 113 for purposes to be explained later. Very shortly however, the condenser 112 becomes charged and loses its shunting effect thereby causing the anode potential of tube RA(1) to drop. This drop of anode potential in conjunction with the rise in cathode potential will extinguish tube RA(1). Tube RA(1) will not sustain another discharge until condenser 112 has dissipated its charge through resistance 111 and unless relay L(1) remains operated to recharge condenser 105. If relay L(1) remains operated for a sufficiently long time tube RA(1) will refire at regular intervals thereby providing plus 50-volt pulses at its cathode K over conductor 113. This initial application to conductor 113 of pulses of about 100 volts magnitude positive with respect to negative 50 volts (that is, plus 50 volts) have no effect upon the other circuits as will be appreciated from subsequent discussion.

Similarly, when tube RE(1) fires, a plus 50-volt pulse is applied to conductor 114 from the cathode K of tube RE(1). Tube RE(1), like tube RA(1), is self-extinguishing by virtue of the condenser 115 shunting the anode resistance 116. The pulses applied to conductor 114 by tube RE(1), as will be explained hereinafter, will fire the start tube ST(1) of the pulse counting chain but have no other effect at this time.

It will be observed that when relay L(1) is released for any reason, the condensers 105 and 106 will lose their accumulated charges in parallel discharge circuits from negative battery, resistances 109 and 110, condensers 105 and 106, rectifiers RE2(1) and RE22(1), conductor 104, resistance 102, to negative battery through the winding of relay S(1). By virtue of the fact that the positive charges on condensers 105 and 106 find rectifiers RE2(1) and RE22(1) low impedances for the discharges, the discharge times are always shorter than the charging times thus precluding the possibility of condensers 105 and 106 integrating short pulses. That is, condensers 105 and 106 will always start timing from the same reference level of time and charge. Furthermore, these discharge currents will assist relay S(1) in remaining operated during the release of relay L(1) representing open line loop pulsing periods.

Upon the operation of relay S(1), above described, a circuit is completed for operating relay ON1(1) from ground, over the contact of relay S(1), the contact of relay ON(1), to negative battery through the winding of relay ON1(1). This ground extends to the sleeve of the switch connection over the dotted path 117 to hold the connection. Relay ON1(1), upon operating, applies positive battery (say 130 volts) over its contact to conductor 204 which supplies plate voltage to the tubes as will be described.

When relay ON1(1) operates, it fires the gas tube GL(1) in an obvious circuit. The tube GL(1) is continuously energized, as long as relay ON1(1) is operated, for the purpose of providing continuous light for keeping the rest of the gas tubes in the circuits energized so they will fire promptly and reliably. This, as will be obvious, is a well known "keep alive" means used extensively in gas tube circuits.

Upon the operation of relay ON1(1), positive anode voltage is supplied to the main anode of the start tube ST(1) of the counting chain (tube ST(1) through tube 0(1) of Fig. 1) over conductor 204, through the left primary winding of transformer T(1), and over conductor 113. Tube ST(1) is normally extinguished thereby setting its cathode at minus 50 volts potential. When tube RE(1) applies the first 100-volt pulse (plus 50 volts) to conductor 114, this pulse is applied to the starter electrode of tube ST(1) from conductor 114 over contact 4 of relay BT(1) to tube ST(1). This pulse of plus 50 volts raises the starter electrode of tube ST(1) some 100 volts positive with respect to the cathode and thereby fires tube ST(1). A surge of current passes to negative battery, through condenser 119 in shunt of the cathode resistance 120, across the main gap of tube ST(1), over conductor 118, through the left primary winding of transformer T(1), from positive battery on conductor 204. The presence of condenser 119 in shunt of resistance 120 comprises effectively a short-circuit across resistance 120 during the surge transient. This insures that the cathode of tube ST(1) will remain at a negative 50-volt potential for a delay time determined by the time required to charge up condenser 119. This delay time is used throughout the counting chain, as will be obvious from an inspection of the repetitive nature of the cathode circuits, for a purpose to be mentioned later. Eventually condenser 119 will become charged to the steady state cathode potential which will be approximately plus 50 volts. This potential is insufficient to fire the gas diode DST(1) connected between the cathode of tube ST(1) and the starter electrode of tube 1(1). It will be noted that when tube ST(1) was fired, condenser 137 was also included in a time delay charging circuits extending from negative battery, through the cathode resistance of tube PG(1), pulsing conductor 135, condenser 137, resistance 136, to the top of resistance 120, which, as has been explained, is attempting to rise to about plus 50 volts. If the condenser 119 were not present, condenser 137 would delay the rise of the plus 50 volt potential at the left electrode of the diode DST(1) a length of time necessary to charge condenser 137 to this newly applied potential. Then the delay caused by the charging of condenser 137 could be used for the same purpose as condenser 119 as far as preventing the instant firing of diode DST(1) is concerned. The circuit, as shown, is arranged such that the time element represented by the combination of condenser 119 and resistance 120 is of the longer and controlling duration, although it should be remembered that condenser 137 does represent a time delay in the application of the plus 50 volt potential to the left electrode of tube DST(1).

The current surge through the left primary winding of transformer T(1) will induce a voltage in the secondary winding which will fire the check tube CK(1). Tube CK(1), upon firing, raises its cathode to about plus 50 volts for a purpose to be explained hereinafter. It will be obvious that any further pulses from tube RE(1) over conductor 114, assuming that relay L(1) is still initially operated, will have no further effect upon tubes ST(1) and CK(1).

When relay ON1(1) operated, positive battery was applied over conductor 204, through the retard coil L1(1), to the main anode of the gas tube ON2(1). This positive potential is also applied to the starter electrode of tube ON2(1) from conductor 204, through resistance 121, condenser 122, and resistance 143. This fires tube ON2(1). Before tube ON2(1) fires its cathode, and thus conductor 202, is at approximately minus 50 volts and the dial tone relay DT(1) is released due to the fact that no current is flowing in the cathode resistance 123. When tube ON2(1) fires, its cathode remains temporarily at about negative 50 volts, by virtue of the condenser 124 shunting the cathode resistance 123 as previously explained, and then rises to about plus 50 volts when condenser 124 becomes charged. The voltage drop across resistance 123 thereupon operates relay DT(1). Relay DT(1), upon operating, applies dial tone over its contact 2, contact 2 of relay BT(1), to the tip side of the line through the left winding of the line relay L(1).

Upon hearing dial tone, the calling subscriber may begin to dial digits of the called subscriber's number, or other called destination.

*The pulse generation and check circuits*

A pulse is transmitted by an open line loop and is detected in the originating register by means of relay L(1) which releases for each pulse.

When relay L(1) releases, the charge on condenser C1(1), which is in the neighborhood of +130 volts, will be discharged in the circuit including condenser C1(1), resistance 103, contacts 3 and 4 and armature of the relay L(1), resistance 124, to ground through the parallel network of resistance 125 and condenser 126. The presence of condenser 126 will delay the effect of this pulse at the starter electrode of tube DP(1) until condenser 126 becomes charged. The positive pulse will be effective to fire tube DP(1) which will cause a current to flow from positive battery on conductor 204, across the main gap of tube DP(1), to negative battery through the cathode resistance 127. The cathode of tube DP(1) will be raised to about +50 volts which 100-volt rise is transferred through condenser C2(1) to the cathode of the check tube CK(1). The cathode of tube CK(1) will temporarily be raised an additional 100 volts above the +50 where it was thereby causing tube CK(1) to be extinguished by this cathode commutation. As soon as condenser C2(1) loses the charge it acquired from the cathode of tube DP(1), the cathode of tube CK(1) will revert to about −50 volts potential to prepare tube CK(1) to be refired as will be described.

As has been described hereinbefore, when relay L(1) releases, the firing condensers 105 and 106 of tubes RA(1) and RE(1) are discharged and relay S(1) remains operated.

The positive pulse from condenser C1(1), in addition to firing tube DP(1) as above described, is applied to the starter electrode of the trouble tube TRL(1) through a time delay circuit. Condenser 128 begins to acquire a charge in a circuit from the positive potential on condenser C1(1), through resistance 103, contacts 3 and 4 and armature of relay L(1), resistances 124 and 129 and 130, condenser 128, to negative battery through the winding of the busy tone relay BT(1). This pulse applied to the tube TRL(1) to fire same is of course also delayed for the additional time required to fire tube DP(1). As soon as tube DP(1) fires, then condenser 128 will continue to acquire a charge due to collector voltage accumulating at the starter electrode of tube DP(1). If condenser 128 is permitted to charge up for a sufficient length of time to fire the trouble tube TRL(1), then relay BT(1) will be operated. If relay BT(1) operates, it opens at its contact 4 the circuit for firing the start tube ST(1) of the counting chain, it closes a circuit over its contact 1 for sounding an alarm and for locking the register busy so it may be tested, and relay BT(1) closes a busy tone signal over its contact 3 to the tip 101 of the line through the left winding of the line relay L(1) to inform the calling subscriber to disconnect and to try again. As will be appreciated from description to follow, if the circuits of the originating register function properly tube DP(1) will be extinguished to permit condenser 128 to discharge through rectifier RE1(1) to ground through resistances 129 and 125 before tube TRL(1) can be fired.

When tube DP(1) was fired thus raising its cathode about 100 volts positive from negative battery (about −50 volts), this positive 100-volt pulse was applied to the starter electrode circuit of the pulse generation tube PG(1) as a charging source for condenser 131 through resistance 132. This charging circuit incorporates a delay between the time when the pulse is produced at the cathode of tube DP(1) and the time when the tube PG(1) will fire. It will be recalled that when the check tube CK(1) was fired initially upon the initial firing of the start tube ST(1), a 100-volt pulse was produced at the cathode of tube CK(1). The delay circuit built into the starter circuit of tube PG(1) is sufficient to prevent tube PG(1) from firing on this initial pulse transferred from the cathode of tube CK(1) through condenser C2(1), until the initial charge on condenser C2(1) has been dissipated through resistances 127 and 133. After a delay interval of some 7 to 8 milliseconds, tube PG(1) will fire thereby raising its cathode from about −50 volts to about +50 volts (100 volts positive). Tube PG(1) is self-extinguishing, as were tubes RA(1) and RE(1), as soon as condenser 134 in the anode circuit of tube PG(1) acquires its charge. The net effect, therefore, is that a positive 100-volt pulse is applied from the cathode of tube PG(1) to the pulsing conductor 135.

It will be recalled that the start tube ST(1) was fired and is conducting. Due to the conduction through tube ST(1) under steady state conditions, the cathode of tube ST(1) will be at about +50 volts. This, as will be remembered, was insufficient to fire the gas diode DST(1) interconnecting the cathode of tube ST(1) to ground through resistances 136 and 138. However, when the pulsing conductor 135 is raised positively 100 volts, the gas diode DST(1) will be fired through condenser 137. The resistance 138 will cause a positive voltage pulse to appear at the starter electrode of tube 1(1) as a result of the current surge therethrough when the diode DST(1) is fired. The relative magnitudes of resistances 138 and 136 are such that the voltage produced across resistance 138 when tube DST(1) fires, is due mostly to the pulse from condenser 137 and very little from the direct current circuit connected to diode DST(1). This pulse will fire tube 1(1). Due to the presence of condenser 139 across the cathode resistance 140 of tube 1(1), the cathode of tube 1(1) will be retained at about −50 volts for a short interval of time to insure that the gas diode D1(1) is not fired from the pulsing conductor 135. Eventually, when condenser 139 becomes charged, the cathode of tube 1(1) will rise to about +50 volts to prepare the diode D1(1) to be fired on the next pulse on conductor 135 from the pulse generation tube PG(1). This counting chain interaction arrangement is disclosed and claimed in Patent 2,616,627 to W. H. T. Holden of November 4, 1952.

The current surge through the left primary winding of transformer T(1), caused by the firing of tube 1(1), will cause the anode voltage at tube ST(1) to drop negatively. This drop of anode voltage at tube ST(1) in conjunction with the fact that condenser 119 retains the cathode at about +50 volts for a short time will extinguish tube ST(1) by anode commutation. Subsequently, tube ST(1) assumes a steady state non-conducting condition whereunder its cathode resumes its −50 volt potential such that tube 1(1) will not refire after it is extinguished unless tube ST(1) is conducting.

The surge of current through transformer T(1) refires tube CK(1) as previously. By cathode commutation through condenser C2(1), tube CK(1) in firing, extinguishes tube DP(1) which in turn allows condenser 128 to discharge before tube TRL(1) can fire. This reverts the pulsing and check circuits to normal awaiting the next operation and release of the line relay L(1) representing the next pulse. As soon as relay L(1) reoperates at the end of the first pulse, relay S(1) is reenergized, condenser C1(1) is recharged, and the timing circuits of tubes RA(1) and RE(1) are started for timing the interdigital pause.

*Counting initial digit of one pulse*

An initial digit of one pulse, unless followed directly by a second digit of one pulse as will be explained, is assumed not to be a legitimate signal, because of the frequency with which such erroneous indication may be effected by accidental manipulation of the subscriber's dial, by spurious electrical impulses, etc. Such an initial digit is absorbed on the basis of the above assumption; but, as will be explained, it is not discarded in view of the fact that a second digit of one pulse is presumed to indicate a legitimate 11 prefix for a special code, such as a service code of 11X, where X may be any digit from 2 to 9.

In discussing the action of the pulse counting chain, the special 11X circuits, and the steering and registering circuits it will be assumed that the pulse generation and check circuits operate normally so as to indicate the proper advance of the counting chain. Previous discussion is adequate for an explanation of trouble conditions. The normal functioning of the pulse detection and checking circuits, as will be apparent from previous discussion, effects the following conditions:

(1) Each time that the line relay L(1) releases and reoperates to indicate a pulse of a digit, a pulse of about 100 volt positive nature is applied to the pulsing conductor 135; and, (2) Each time that the line relay L(1) remains operated for a sufficient time to represent an interdigital pause, tubes RA(1) and RE(1) fire in succession to apply one pulse each of about 100 volt positive amplitude to respective conductors 113 and 114, the pulse on conductor 114 following the pulse on conductor 113 by a timed period.

At the end of the first digit of one pulse, as above discussed, tube 1(1) will be conducting and tube ST(1) will be extinguished. Due to the conduction through tube 1(1), the upper terminals of the two gas diodes TD10(1) and TD11(1) connected to the cathode of tube 1(1) will be set at plus 50 volts after a delay of time after the firing of tube 1(1) necessary to charge condensers C3(1) and C4(1) to this newly applied potential. The lower terminals of tubes TD10(1) and TD11(1) are connected over respective conductors 210 and 211 in parallel to ground through resistances 208 and 209 and through respective condensers 206 and 207 to the upper terminals of respective gas diodes TDA0(2) and TDA1(2) of Fig. 2 associated with the A digit register tubes A0(2) to A(7).

The diodes TDA0(2), TDA1(2), TDA2(2), TDA4(2), and TDA7(2) are all controlled, as regards the potential on their upper terminals, from the cathode of the A digit steering tube A(2). With the tube A(2) non-conducting, its cathode, and thus the upper terminal of the A register diodes, is at negative battery potential (minus 50 volts) from conductor 203. The only time that a register tube, such as tube A0(2) or A1(2), can be fired to register a digit is when the two diodes, such as TD10(1) and TD11(1), associated with a counting tube, such as tube 1(1), can fire in cascade with two corresponding tubes, such as diodes TDA0(2) and TDA1(2) or TDB0(2) and TDB1(2), etc., or TDG0(2) and TDG1(2), associated with a particular group of register tubes. This condition exists only when the associated steering tube, such as tube A(2) is conducting and when the associated counting tube, such as tube 1(1) is conducting. When a counting tube, such as tube 1(1) is conducting, the 100 volt positive pulse from the tube RA(1) over conductor 113 will fire both associated diodes, such as diodes TD10(1) and TD11(1), because the 100 volt pulse will drive the upper terminals of the diodes to about plus 150 volts which is sufficient to fire them since their lower terminals are returned to ground over conductors 210 and 211 and through resistances 208 and 209. The resulting pulse of about plus 100 volts developed across these resistances 208 and 209 will attempt to fire all register tube diodes, such as TDA0(2) and TDA1(2), TDB0(2) and TDB1(2), etc., TDG0(2) and TDG1(2), associated therewith. 100 volts is insufficient to fire these diodes however, unless they have been enabled by having their upper terminals raised to plus 50 volts from minus 50 volts by the associated conducting steering tube, such as tube A(2). In the present instance, register tube diodes TDA0(2) and TDA1(2), as well as the corresponding diodes of other register groups, will not be fired because the associated steering tubes are non-conducting. Thus the pulse generated by tube RA(1) is not effective to register the first digit of one pulse. As soon as the pulse from tube RA(1) ceases, the diodes, such as TD10(1) and TD11(1) which may have fired are extinguished.

A short interval after the pulse on conductor 113 from tube RA(1), tube RE(1) generates a 100-volt positive pulse on conductor 114, as has been described. The gas diode PPD(1) in the starter electrode circuit of tube PP(1) is controlled from three quarters. The pulsing conductor 114 from tube RE(1) is connected thereto through condenser S1(1). Also, the cathode of tube 1(1) is connected thereto through the resistance 152 and rectifier RE3(1). Furthermore, the cathode of tube ON2(1) is connected thereto through the resistance 153 and rectifier RE4(1). The right terminal of the gas diode PPD(1) is at ground potential through resistance 154 and therefore it will require a pulse of at least 100 positive volts to fire the diode PPD(1). The common connection between rectifiers RE3(1) and RE4(1) will, due to the polarity of such rectifiers, assume the move negative potential of the respective arrow terminals. At the end of the first digit of one pulse both cathodes of tubes 1(1) and ON2(1) are at plus 50 volts and thus the left terminal of the diode PPD(1) will be at plus 50 volts. The 100 volt positive pulse on conductor 114 from tube RE(1) will thus fire the gas diode PPD(1) and the latter, through the agency of the current surge in resistance 154, will fire the tube PP(1). The condenser 155 shunting the cathode resistance 156 of tube PP(1) holds the cathode of tube PP(1) at minus 50 volts long enough to prevent the firing of tube 11(1) on the first pulse from tube RE(1). Eventually condenser 155 becomes charged and the cathode of tube PP(1) rises to about plus 50 volts to condition the diode D11(1) so that it will fire tube 11(1) on a second digit of one pulse.

In addition, when tube RE(1) generates the interdigital pulse on conductor 114, the start tube ST(1) is refired over the contact 4 of relay BT(1). The resulting current surge through tube ST(1), as has been explained, extinguishes the tube 1(1) by anode commutation and the circuits are ready to receive the next digit.

It will be observed that none of the steering tubes, such as tubes A(2) to H(2), have been operated in response to the first digit of one pulse and that, although this first pulse has been absorbed by the firing of tube PP(1), the first pulse has not been discarded.

Furthermore, it will be seen that the above-described means for transferring the pulse count from the counting tubes of Fig. 1 to the register tubes of Fig. 2 involves two gas diodes for each counting tube, such as diodes TD10(1) and TD11(1) for counting tube 1(1). These diodes, under proper conditions as have also been indicated, will fire two-out-of-five register tubes, such as tubes A0(2) and A1(2). This two-out-of-five code is well known and is arranged as follows:

| Digit | Counting Chain Diodes Fired | Register Tube Diodes Fired | Register Tubes Fired |
|---|---|---|---|
| 1 | TD10(1)-TD11(1) | TDA0(2)-TDA1(2) | A0(2)-A1(2). |
| 2 | TD20(1)-TD22(1) | TDA0(2)-TDA2(2) | A0(2)-A2(2). |
| 3 | TD31(1)-TD32(1) | TDA1(2)-TDA2(2) | A1(2)-A2(2). |
| 4 | TD40(1)-TD44(1) | TDA0(2)-TDA4(2) | A0(2)-A4(2). |
| 5 | TD51(1)-TD54(1) | TDA1(2)-TDA4(2) | A1(2)-A4(2). |
| 6 | TD62(1)-TD64(1) | TDA2(2)-TDA4(2) | A2(2)-A4(2). |
| 7 | TD70(1)-TD77(1) | TDA0(2)-TDA7(2) | A0(2)-A7(2). |
| 8 | TD81(1)-TD87(1) | TDA1(2)-TDA7(2) | A1(2)-A7(2). |
| 9 | TD92(1)-TD97(1) | TDA2(2)-TDA7(2) | A2(2)-A7(2). |
| 0 | TD104(1)-TD107(1) | TDA4(2)-TDA7(2) | A4(2)-A7(2). |

*Counting a second digit of one pulse*

If a second digit of one pulse is received and counted by the originating register circuit, it is assumed that this is a legitimate indication of an 11 prefix to a special code, such as a special 11X code of a service nature.

When relay L(1) releases on the first pulse of the second digit, the pulse generation tube PG(1) again produces a positive 100 volt pulse on the pulsing conductor 135. This pulse fires tube 1(1) which extinguishes the start tube ST(1) by anode commutation. Again, since tubes ON2(1) and 1(1) are both conducting, the left terminal of the gas diode PPD(1) is raised to plus 50 volts. Since tube 1(1) is energized, the upper terminals of the gas diodes TD10(1) and TD11(1) are again raised to plus 50 volts.

When relay L(1) reoperates at the end of the first pulse and remains operated to indicate the time delay between digits, tube RA(1) fires to produce a 100 volt positive pulse on conductor 113. This pulse will, as before, fire the gas diodes TD10(1) and TD11(1) associated with the cathode of counting tube I(I). However, since the steering tube A(2) of Fig. 2 has not been energized, the digit one, represented by the firing of the diodes TD10(I) and TD11(I), will not be registered in the A digit register tubes A0(2) and A1(2).

Subsequent to the firing of tube RA(I), tube RE(I) fires to produce on conductor 114 a 100 volt positive pulse. By virtue of the fact that tube PP(I) is conducting, as has been explained, the cathode thereof, and thus the left terminal of the gas diode D11(I) is raised to plus 50 volts. The pulse on conductor 114 will fire the diode D11(I) through condenser 157 thereby firing the tube 11(I). The cathode of tube 11(I) will be raised to plus 50 volts thereby raising the potential of conductor 201 from minus 50 volts to plus 50 volts. The energization of conductor 201 is an indication that an 11 prefix has been detected and registered in the counting circuit. This indication is used in a manner presently to be described. When tube 11(I) is fired it extinguishes tube PP(I) by cathode commutation through condenser 158.

Further detection of digits of one pulse each, whether intentional or not, will have the effect merely of alternating the conduction in tubes PP(I) and 11(I). A timing circuit (not shown) may be provided which, under this condition, will eventually call in a marker circuit for the purpose of switching the calling line to a permanent signal tone trunk to call in an operator for trouble analysis. Examples of such circuits are fully described in the Busch and Dehn disclosures above-identified. Such circuit may also be used to indicate a total failure of the calling line to dial any digits at all or to indicate the receipt of the originating register of only one pulse followed by a continuous operation of the line relay L(I). Other trouble conditions may be met by other known circuits but, since the present invention is not particularly concerned with such expedients, none of these circuit means is shown or described.

*Counting and registering the X digit of an 11X code*

It will be assumed that, after the dialing of two digits of one pulse each, the calling subscriber dials a digit greater than one pulse, such as three pulses, to indicate a special 11X code.

Upon the first release of relay L(I), the resulting pulse on conductor 135 fires tube I(I), thereby extinguishing tube ST(I). The second release of relay L(I) occurs before tubes RA(I) and RE(I) can fire and thus the second pulse on conductor 135 fires tube 2(I), thereby extinguishing tube I(I). When tube 2(I) fires, its cathode is raised to plus 50 volts thereby producing a 100 volt positive pulse to the starter electrode of tube A2(I) over conductor 159. When tube A2(I) fires it extinguishes itself by virtue of the anode circuit arrangement of condenser 160 in shunt of the anode load resistance 161, as has been discussed. Tube A2(I), upon firing momentarily, raises its cathode to about plus 50 volts and the resulting 100 volt positive pulse is applied through condenser 162 to conductor 202. Since conductor 202 was originally at plus 50 volts due to conduction through tube ON2(I), the conductor 202 is now momentarily provided with a pulse extending to about plus 150 volts. This pulse will fire the gas diode DA(2) to in turn fire the steering tube A(2). Condenser 215 in the cathode circuit of tube A(2) will hold the cathode at minus 50 volts for a short length of time and then will permit the cathode to assume a potential of about plus 50 volts. This plus 50 volt potential will enable the gas diode DB(2) to be fired by the next pulse on conductor 205 from conductor 114 at the end of the next digit. This plus 50 volt potential from the cathode of tube A(2) also raises the potential of the upper terminals of diodes TDA0(2), TDA1(2), TDA2(2), TDA4(2), and TDA7(2) to about plus 50 volts such that this three pulse digit will be registered in the A digit register tubes.

When tube A(2) fires, the surge of current through retard coil L1(I) over conductor 200 extinguishes tube ON2(I). Tube ON2(I), upon ceasing to conduct, releases the dial tone relay DT(I).

Thus, it will be observed, digits may be registered in the registers of Fig. 2 only after a digit of more than one pulse is counted by the counting circuits of Fig. 1.

Relay L(I) will reoperate and release again before tubes RA(I) and RE(I) can fire thus producing a third pulse on conductor 135. This pulse will fire tube 3(I) which in turn will extinguish tube 2(I).

At this juncture tubes A(2), 3(I), and 11(I) will be operated. When relay L(I) releases at the end of the three pulse digit, tube RA(I) fires to produce a 100 volt positive pulse on conductor 113. This pulse will fire gas diodes TD31(I) and TD32(I) associated with the conducting tube 3(I). The firing of these diodes will create positive pulses across the resistances 209 and 216 respectively of Fig. 2 due to passage of current therethrough from the diodes over conductors 211 and 212. Since the upper terminals of the gas diodes TDA1(2) and TDA2(2) are at plus 50 volts due to conduction in tube A(2), the positive pulses across resistances 209 and 216 will fire these diodes, which, in turn, will cause surges of current in resistances 217 and 218 to fire tubes A1(2) and A2(2). The tubes A1(2) and A2(2) will remain conducting to indicate the registration, on a two-out-of-five basis, of the digit 3.

Subsequent to the pulse from tube RA(I), tube RE(I) fires to produce a 100 volt positive pulse on conductor 114. This pulse will refire tube ST(I), thereby extenguishing tube 3(I) to recycle the counting chain. This pulse will also be applied over conductor 205 to fire the diode DB(2) through condenser 219. The firing of diode DB(2) causes the B digit steering tube B(2) to conduct and to extinguish tube A(2) by anode commutation through the agency of retard coil L1(I). The condenser 223 across the cathode resistance 225 of tube B(2) holds the cathode at minus 50 volts long enough to prevent the firing of the diode DC(2) by the present pulse on conductor 205. Eventually, when the condenser 223 becomes charged, the cathode of tube B(2) will rise to plus 50 volts. This rise of potential primes the diodes TDB0(2), TDB1(2), TDB2(2), TDB4(2), and TDB7(2), for the B digit register so that two-out-of-five of these diodes will be fired to register the next digit. When tube A(2) was extinguished, the plus 50 volt priming potential was removed from the corresponding A digit register diodes so that the A digit register cannot be affected by subsequent digits.

On 11X codes it is the practice for the originating register to "call in" a marker circuit as soon as the X digit is registered in the A digit register. The indication that such has taken place is the firing of the B digit steering tube B(2). It will be recalled that the conduction by tube 11(1) raised the potential of conductor 201 from minus 50 volts to plus 50 volts by virtue of the connection of the cathode of tube 11(1) to conductor 201. When tube B(2) fires, its cathode raises the potential of conductor 226 from minus 50 volts to plus 50 volts. These two conductors 201 and 226 are connected to the top terminals of respective rectifiers R3(2) and R4(2). These rectifiers are arranged and poled such that their connected arrow terminals will assume a potential which is the more negative of the two potentials on conductors 201 and 226. If either or both of conductors 201 and 226 is at minus 50 volts, then the arrow terminals of rectifiers R3(2) and R4(2) will be at substantially minus 50 volts and tube H1(2) will not fire. However, if both of conductors 201 and 226 are at plus 50 volts, as they will be under the present conditions of an 11X code (a code of 113 in the example), then the arrow terminals of rectifiers R3(2) and R4(2) will rise to about plus 50 volts and will therefore fire tube H1(2) through the rectifier R6(2).

When tube H1(2) fires, it extinguishes tube B(2) by anode commutation and operates the marker start relay MST(2). Relay MST(2), upon operating, causes the seizure of an idle marker circuit for the purposes of completing the desired call, which, in the case of an 11X service code, may be to a suitable operator.

*Regular seven digit local call*

For calls which are directed to local subscribers, there will be no 11 prefix and the digits dialed may represent the familiar A, B, and C office digits followed by four station numericals. In this case the first digit will be greater than one pulse and thus will be registered in the A digit register. The next six digits will be successively registered in the B, C, D, E, F, and G registers. At the end of the registration of the G or seventh digit, tube H(2) will be fired thereby operating relay MST (2) to seize an idle marker circuit for the purpose of completing the desired connections. During this sequence of operation, the tube H1(2) will not be fired when the B digit steering tube B(2) conducts because conductor 201 will be at minus 50 volts due to the fact that tube 11(1) was not fired.

*A zero operator call*

If the first digit dialed were the digit 0, representing ten pulses, the digit ten would be registered in the A digit register by the firing of register tubes A4(2) and A7(2). These two tubes would raise the potential of conductors 228 and 229, connected to their respective cathodes, from minus 50 volts to plus 50 volts. As was the case with the 11X codes, making conductors 201 and 226 both plus 50 volts, these two conductors 228 and 229 will increase the potential of the arrow terminals of rectifiers R1(2) and R2(2) from minus 50 volts to plus 50 volts thereby to fire tube H1(2) and operate relay MST(2). This action seizes an idle marker after the first digit is registered for the purposes of switching the calling subscriber's line circuit to an operator, as desired.

*Marker operation*

When an idle marker (not shown) is seized due to the operation of relay MST(2), the register tubes of Fig. 2 are connected to the seized marker over cable 230 for the purpose of transferring the registered information to the marker. The transfer is made by circuits in the marker which can detect which cathodes of which register tubes are at plus 50 volts. The marker is also supplied (by means not shown) with other information concerning the call, such as the location of the calling subscriber's line circuit in the office plant, the class of service to which the calling subscriber is entitled, the nature of the call (11X call, zero operator call, etc.), etc. From this information the marker proceeds to supply the service requested.

Whenever in the claims a "gate" or "gating means" is referred to as "closed" or "open" it is to be understood that a "closed" gate is one which will not permit a signal to pass; whereas, an "open" gate is one which will permit a signal to pass.

While the invention has been disclosed herein by way of example as embodied in a circuit using cold cathode gas discharge tubes, it will be an obvious modification within the skill of the art to substitute hot cathode thyratrons for the cold cathode tubes, in order for instance to embody added speed of operation in the circuits.

Furthermore, with regard to the voltage responsive gates, which in the exemplary embodiment comprise gas discharge cold cathode diodes, it will be an obvious modification to substitute for these diodes other known suitable gating means, such, for instance, as dry rectifiers or the like.

As far as the utility of the present invention is concerned, while it has been disclosed herein as embodied in a decimal or decade counter circuit arrangement, it will be apparent to those skilled in the art that the invention may be applied within its spirit and scope to other similar circuit arrangements, such as binary counters, digital computer circuits, etc.

It is to be understood that the above-described arrangements are merely illustrative of the application of the principles of the invention. Numerous other arrangements may be devised by those skilled in the art without departing from the spirit and scope of the invention.

What is claimed is:

1. In a signaling system, a plurality of first sources of signal voltage, a number of register devices operative in groups to indicate a signal from one of said first sources, each group comprising a different plurality of register devices operative to indicate a different one of said first sources, a number of first normally closed voltage responsive gates connected to each first source and equal to the plurality of register devices indicative of the associated first source, a second normally closed voltage responsive gate connected to each register device, an electronic connection between each first gate and the second gate associated with the register device corresponding to said first gate, a second source of signal voltage, a third source of signal voltage, means for applying said first sources and said second source to said first gates at times independent of one another, the particular first gates associated with one of said first sources being open only when said one first source and said second source are applied to said particular first gates concurrently, means for applying said third source to said second gates at times independent of said other sources, the particular plurality of second gates associated with the plurality of register devices indicative of the said one first source being open only when said third source is applied to said particular second gates concurrently with the opening of said particular first gates, said plurality of register devices indicative of said one first source operative in response to a signal from said one first source only when both of said particular first and second gates are open concurrently.

2. In a signaling system, a plurality of first sources of signal voltage, a number of identical sets of register devices, each set operative in groups of devices in said set to indicate a signal from one of said first sources, each group comprising a different plurality of register devices operative to indicate a different one of said first sources, a number of first normally closed voltage responsive gates connected to each first source and equal to the plurality of register devices of a set thereof indicative of the associated first source, a second normally closed voltage responsive gate connected to each register device, an electronic connection between each first gate and the second gate associated with the register device of each set corresponding to said first gate, a second source of signal voltage, a third source of signal voltage, means for applying said first sources and said second source to said first gates at times independent of one another, the particular first gates associated with one of said first sources being open only when said one first source and said second source are applied to said particular first gates concurrently, means for applying said third source to the sets of said second gates at times independent of said other sources, the particular plurality of second gates of a particular set thereof associated with the plurality of register devices indicative of the said one first source being open only when said third source is applied to said particular set of second gates concurrently with the opening of said particular first gates, said plurality of register devices of a set thereof indicative of said one first source operative in response to a signal from said one first source only when both of said particular first and second gates are open concurrently.

3. In a signaling system, ten first sources of signal voltage, a plurality of sets of register devices, each set comprising five register devices operative in different pairs to indicate signals from different ones of said first sources, two normally closed first voltage responsive gates connected to each first source, a normally closed second voltage responsive gate connected to each register device, an electronic connection between each first gate and the second gate associated with the register device of each set thereof corresponding to said first gate, a second source of signal voltage, a third source of signal voltage, means for applying said first sources and said second source to said first gates at times independent of one another, the two first gates particular to one of said first sources being open only when said one first source and said second source are applied to said two particular first gates concurrently, means for applying said third source to the sets of said second gates at times independent of said other sources, the two second gates particular to the pair of register devices of a set indicative of the said one first source being open only when said third source is applied to the set of second gates containing said two particular second gates concurrently with the opening of said particular pair of first gates, said pair of register devices of a set and associated with said particular pair of second gates and indicative of said one first source operative in response to a signal from said one first source only when both of said particular first and second gates are open concurrently.

4. The invention as claimed in claim 3 wherein the said ten first sources of signal voltage comprise a decade pulse counting arrangement including ten signal voltage output sources where each discrete signal voltage output represents the total pulse count by said counting arrangement of a series of pulses supplied thereto.

5. The invention as claimed in claim 4 wherein the said voltage responsive gates comprise electron discharge devices.

6. The invention as claimed in claim 5 wherein the said electron discharge devices contain ionizable gas which is the discharge medium.

7. The invention as claimed in claim 6 wherein the said gas discharge devices are gas diodes.

8. The invention as claimed in claim 7 wherein the said counting arrangement comprises an electronic pulse counting chain and wherein said register devices comprise electronic discharge devices.

9. The invention as claimed in claim 8 wherein the said electronic discharge register devices comprise three element gas discharge tubes.

10. In a signaling system, means for generating trains of pulses, a chain of electron discharge tubes for counting said trains of pulses by advancing conduction from tube to tube in said chain in response to successive pulses of a train, a plurality of sets of electron discharge register tubes, each set comprising five corresponding tubes, five control conductors, voltage responsive steering gates, each corresponding register tube of all sets thereof being connected through a separate steering gate to the same one of said control conductors, voltage responsive pulsing gates, each counting tube being connected through a separate pair of pulsing gates to a separate pair of said control conductors, means effective upon the termination of the train of pulses to open the pulsing gates associated with the last conducting counting tube, a chain of electron discharge steering tubes, each steering tube associated with a different set of register tubes, means effective upon the termination of successive trains of pulses to render conducting successive steering tubes, and means effective upon the conduction in each steering tube to open the steering gates of the associated set of register tubes, whereby pairs of register tubes of successive sets of register tubes are rendered selectively conducting to register the pulse count of successive trains of pulses.

11. In a signaling system, means for generating trains of pulses, a chain of gas tubes for counting said trains of pulses by advancing conduction from tube to tube in said chain in response to successive pulses of a train, a plurality of sets of gas register tubes, each set comprising five corresponding tubes, five control conductors, gas diode steering gate tubes, each corresponding register tube of all sets thereof being connected through a separate steering gate tube to the same one of said control conductors, gas diode pulsing gate tubes, each counting tube being connected through a separate pair of pulsing gate tubes to a separate pair of said control conductors, means effective upon the termination of a train of pulses to render conducting the pulsing gate tubes associated with the last conducting counting tube, a chain of electron discharge steering tubes, each steering tube associated with a different set of register tubes, means effective upon the termination of successive trains of pulses to render conducting successive steering tubes, and means effective upon the conduction in each steering tube to render conducting the steering gate tubes of the associated set of register tubes, whereby pairs of register tubes of successive sets of register tubes are rendered selectively conducting to register the pulse count of successive trains of pulses.

12. In a signaling system, means for generating trains of pulses representing successive digits, a chain of gas tubes for counting said digits by advancing conduction from tube to tube in said chain in response to successive pulses of successive digits, a plurality of sets of gas register tubes, each set arranged to register therein the pulse count of a particular digit and comprising five corresponding tubes, five control conductors, gas diode steering gate tubes, each corresponding register tube of all sets thereof being connected through a separate steering gate tube to the same one of said control conductors, gas diode pulsing gate tubes, each counting tube being connected through a separate pair of pulsing gate tubes to a separate pair of said control conductors, means effective upon the termination of a train of pulses representing a particular digit to render conducting the pulsing gate tubes associated with the last conducting counting tube, a chain of electron discharge steering tubes, each steering tube associated with a different set of register tubes, means effective upon the termination of successive trains of pulses representing successive digits to render conducting successive steering tubes, and means effective upon the conduction in each steering tube to render conducting the steering gate tubes of the associated set of register tubes, whereby pairs of register tubes of successive sets of register tubes are rendered selectively conducting to register the pulse count of successive digits.

References Cited in the file of this patent

UNITED STATES PATENTS

| Number | Name | Date |
| --- | --- | --- |
| 2,088,793 | Judge | Aug. 3, 1937 |
| 2,373,134 | Massonneau | Apr. 10, 1945 |
| 2,404,739 | Mumma | July 23, 1946 |
| 2,438,492 | Bascom et al. | Mar. 30, 1948 |
| 2,460,789 | Thompson | Feb. 1, 1949 |
| 2,503,127 | Mumma | Apr. 4, 1950 |
| 2,549,769 | Bray et al. | Apr. 24, 1951 |